United States Patent
Wykoff et al.

(10) Patent No.: US 7,708,932 B2
(45) Date of Patent: May 4, 2010

(54) CHILLED AIR PRESSURE BOX FOR THERMOFORMING A PLASTIC SHEET AND A METHOD OF THERMOFORMING THE SAME

(75) Inventors: Richard Wykoff, Commerce Township, MI (US); Stanley Staniszewski, Grosse Pointe Woods, MI (US); Kedzie Fernholz, New Boston, MI (US); Joshua Bosworth, Hastings, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 691 days.

(21) Appl. No.: 11/537,735

(22) Filed: Oct. 2, 2006

(65) Prior Publication Data
US 2008/0079199 A1   Apr. 3, 2008

(51) Int. Cl.
*B29C 51/10* (2006.01)
(52) U.S. Cl. .................. 264/553; 264/322; 425/388; 425/384
(58) Field of Classification Search .............. 425/388, 425/384, 149; 264/553, 322
See application file for complete search history.

(56) References Cited
U.S. PATENT DOCUMENTS

| | | | |
|---|---|---|---|
| 2,975,476 A * | 3/1961 | Burke ..................... 425/143 |
| 3,713,765 A | 1/1973 | Rise | |
| 3,879,166 A * | 4/1975 | Wright ..................... 432/176 |
| 4,878,826 A * | 11/1989 | Wendt ..................... 425/384 |
| 5,620,715 A | 4/1997 | Hart et al. | |
| 5,858,414 A | 1/1999 | Hayashi et al. | |
| 5,965,083 A | 10/1999 | Reichenberger et al. | |
| 6,454,556 B1 | 9/2002 | De Nichilo | |
| 6,537,477 B1 | 3/2003 | Nichilo | |
| 2004/0076846 A1 | 4/2004 | Domine et al. | |
| 2006/0038325 A1 | 2/2006 | Ostrander et al. | |

* cited by examiner

*Primary Examiner*—Joseph S Del Sole
*Assistant Examiner*—Ninh V Le
(74) *Attorney, Agent, or Firm*—Raymond L. Coppiellie; Brooks Kushman P.C.

(57) ABSTRACT

A chilled air pressure box is provided for thermoforming a plastic sheet. The chilled air pressure box comprises a box, a box perimeter, an inlet valve, a compressed air source and a chilled air source. The box has an interior space within the box and defines an inlet opening. The box perimeter is for sealingly interfacing with a vacuum mold. The inlet valve is substantially disposed within the interior space, adjacent and aligned with the inlet opening such that when the inlet valve is closed the inlet opening is substantially sealed and when the inlet valve is opened the inlet opening is not sealed. The compressed air source is capable of pressurizing the interior space with compressed air and interfaces with the box. The chilled air source communicates with the inlet opening.

18 Claims, 3 Drawing Sheets

CHILLED AIR PRESSURE BOX FOR THERMOFORMING A PLASTIC SHEET AND A METHOD OF THERMOFORMING THE SAME

BACKGROUND OF THE INVENTION

1. Field of the Invention

The present invention relates generally to thermoforming of a plastic sheet. More specifically, the invention relates to a chilled air pressure box for thermoforming a plastic sheet and a method of thermoforming a plastic sheet.

2. Background Art

Appearance is often an important consideration in manufacturing parts with exposed surfaces, including but not limited to exterior and interior vehicle trim components. For this reason, original equipment manufactures (OEM) or automotive part suppliers may specify requirements regarding visible surfaces of trim components, sometimes referred to as Class "A" surfaces, including gloss targets and acceptable gloss ranges. For instance, an automotive exterior component such as a bumper fascia or a body side molding may have a Class "A" high gloss target value of 85 as measured with a 20 degree BYK Gardner gloss meter. However, the acceptable gloss range may be 80 to 90. An automotive interior component such as an instrument panel may have, for example, a Class "A" low gloss target of 2 with an acceptable gloss range of 1.5 to 2.5. This lower gloss target and more narrow gloss range for an instrument panel may in part be due to veiling glare requirements. Thus, gloss targets and acceptable ranges of gloss may vary considerably depending on the particular part and the desired visual effect.

Typical techniques for manufacturing these trim components may often be accomplished by injection molding the component where the color and gloss may be imparted either by painting the part after it has been injection molded or by directly molding in the color and the gloss. This latter process is often referred to as molded in color (MIC). MIC is either done by using a color concentrate masterbatch, which is blended into a plastic resin mixture during the injection molding process, or pre-coloring the plastic resin mixture prior to the resin being introduced to the injection molding machine. Both painting and MIC production techniques are proven and function well.

However, there are a number of negatives associated with each of these processes. For instance, injection molding requires large steel tools to be cast and machined. This is expensive and often requires long lead times. In some cases, for example, a large component such as a bumper fascia may require 36 to 52 weeks to produce production tooling.

The painting process may have a long cycle time where the parts may need to be post baked for 30 minutes or longer at an elevated temperature, such as 250° F. Additionally, many of these trim components may be injection molded from a polyolefin material, such as TPO, PP or a TPE, where an expensive surface treatment prior to painting, such as corona treatment, flame treatment or application of a chlorinated polyolefin adpro, may be required for proper paint adhesion. High scrap rates due to surface defects, low film builds and poor adhesion of the paint to the part may also occur.

Parts produced by a MIC process may lack the added surface protection provided by the paint coating used on painted components, and may therefore be more susceptible to chemical attack from fuels and other fluids, UV fading, scratches and other surface marring. Moreover, MIC parts may have a propensity to stress whitening, which is a white surface blemish resulting from handling or impact stresses.

Presently, new technologies are developing that may minimize higher cost, longer lead times and other short comings associated with injection molding and decoration of parts by either MIC or painting. These technologies involve the use of a thermoformable plastic sheet comprising a thermoplastic layer and an opposite paint film layer. The paint film layer may have a color and an initial gloss that meets the Class "A" specifications established by an OEM or others. Additionally, the paint film layer may optionally include a dry paint layer covered by a clear coat layer such as polyvinylidene fluoride PVDF, which may be appropriate for not only meeting the Class "A" craftsmanship requirements of a component but other performance requirements such as chemical resistence, fade, scratch and mar.

While the technology for thermoforming a plastic sheet has become well established, there remains the problem that current methods of thermoforming when used to thermoform a laminate plastic sheet comprising a thermoplastic layer and a paint film layer may adversely affect the gloss of the paint film layer. This affect on gloss may be due to hazing, which may result within the paint film layer if some critical temperature is reached. This problem may be further compounded if the temperature required for thermoforming the thermoplastic layer exceeds a critical hazing temperature of the paint film layer. Current methods of thermoforming do not adequately provide active cooling techniques that allow the paint film layer to be maintained below a critical temperature as thermal conduction from the higher temperature thermoplastic layer occurs.

In view of the above, it is apparent that there exist a need for a cooling apparatus, together with a method of thermoforming a plastic sheet having a paint film layer, which preserves the gloss finish of the paint film layer within an acceptable range, especially under high volume manufacturing conditions.

SUMMARY OF THE INVENTION

In at least one embodiment of the present invention, a chilled air pressure box for thermoforming a plastic sheet is provided. The chilled air pressure box includes a wall defining a box. The box has an interior surface and an opposite exterior surface. The interior surface defines an interior space within the box. The box has an inlet opening extending through the interior surface and the exterior surface. The wall defines a box perimeter for interfacing with a vacuum mold. An inlet valve is substantially disposed within the interior space, adjacent and aligned with the inlet opening such that when the inlet valve is closed the inlet opening is substantially sealed and when the inlet valve is opened the inlet opening is not sealed. A compressed air source, which is capable of pressurizing the interior space with compressed air, interfaces with the box. A chilled air source communicates with the inlet opening.

In at least one other embodiment of the present invention, a chilled air pressure box for thermoforming a plastic sheet is provided. The chilled air pressure box comprises a wall defining a box. The box has an interior surface and an opposite exterior surface. The interior surface defines an interior space within the box. The box has an inlet opening extending through the interior surface and the exterior surface. The wall defines a box perimeter for interfacing with a vacuum mold. An inlet valve is substantially disposed within the interior space and interfaces with the inlet opening such that when the inlet valve is closed the inlet opening is substantially sealed and when the inlet valve is opened the inlet opening is not sealed. A compressed air source, capable of pressurizing the interior space with compressed air, interfaces with the box. The chilled air source communicates with the inlet opening. An inlet seal is disposed between the inlet valve and the interior surface, whereby when the interior space is pressurized, the inlet valve is closed and acts on the inlet seal by pressure from compressed air.

In at least one embodiment of the present invention, a method of thermoforming a plastic sheet is provided. The plastic sheet has a first side comprising a thermoplastic layer and an opposite second side comprising a paint film layer having an initial gloss. The method comprises heating the plastic sheet. The plastic sheet is then introduced to a vacuum mold which includes a mold surface, whereby the first side of the plastic sheet faces towards the mold surface. The plastic sheet is introduced to a chilled air pressure box. The chilled air pressure box comprises a box, an inlet seal, and an inlet door valve. The box has an interior space within the box and interfaces with a compressed air source capable of pressurizing the box with compressed air. Both the inlet seal and the inlet door valve are substantially disposed within the interior space. A chilled air source communicates with the inlet door valve. The chilled air source is capable of cooling the interior space with chilled air, whereby the inlet door valve is in a closed position when the interior space is pressurized, and seals the interior space from chilled air by acting on the inlet seal by pressure from compressed air and when the inlet door valve is in an open position, the interior space is not sealed. The second side of the plastic sheet faces towards the interior space. The plastic sheet is forced to conform to the shape of the mold surface by applying a vacuum to the mold surface by a vacuum source substantially simultaneously with pressurizing the interior space, wherein the vacuum draws the first side to the mold surface and compressed air pushes the second side towards the mold surface. The plastic sheet is cooled by opening the inlet door valve whereby chilled air enters the interior space and contacts the second side, wherein the second side is cooled at a rate that substantially preserves the initial gloss.

DETAILED DESCRIPTION OF THE PREFERRED EMBODIMENT(S)

Figure 1:
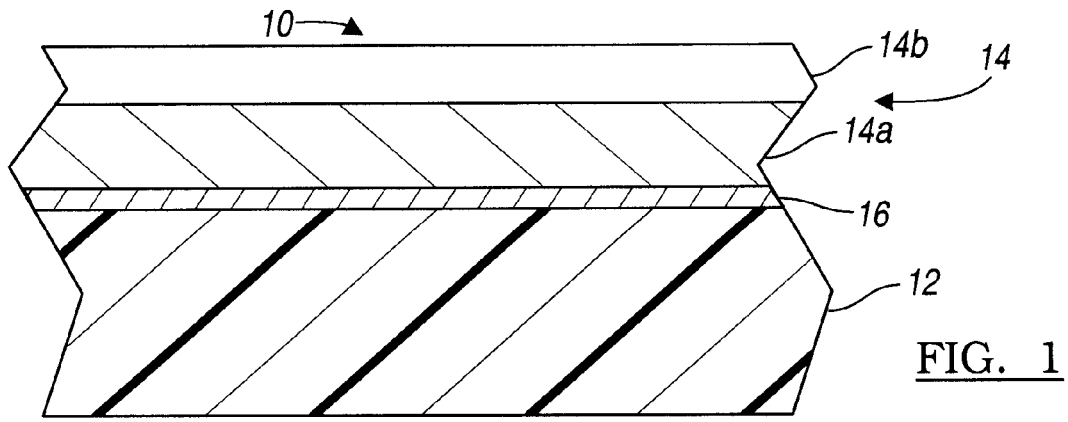
FIG. 1 is a sectional view of a portion of the plastic sheet.

Detailed embodiments of the present invention are disclosed herein. It is understood, however, that the disclosed embodiments are merely exemplary of the invention that may be embodied in various and alternative forms. The figures are not necessarily to scale, some figures may be exaggerated or minimized to show the details of the particular components. Therefore, specific structural and functional details disclosed herein are not to be interpreted as limiting, but merely as a representative basis for the claims and/or as a representative basis for teaching one skilled in the art to practice the present invention.

An embodiment of the present invention will now be described with references to FIGS. 1-3e. As previously mentioned, thermoforming is well known in many industries. Typically, thermoforming employs the use of a thermoforming press and a vacuum mold.

The thermoforming press often includes heaters and a clamp frame. The press may be a rotary style or a fixed style. In the case of a rotary style press, a thermoplastic sheet is fixtured in the clamp frame where the thermoplastic sheet may be heated at one station, then rotated to another station to be formed by a vacuum mold. Alternatively, in a fixed press, a thermoplastic sheet is fixtured in the clamp frame where the heaters heat the thermoplastic sheet. The heaters are then retracted and the vacuum mold is positioned beneath the thermoplastic sheet where the sheet is then formed. Typically in both styles of presses, the clamp frame is much larger than the vacuum mold and surrounds the mold during forming, thus limiting the exterior working space immediately surrounding the mold and forming vicinity. Also typical with many thermoforming presses is their low tonnage capacity, which may result in weight restrictions for vacuum molds and other auxiliary devices subject to up/down press actuations.

The vacuum mold for thermoforming includes a mold surface. The vacuum mold may also have varying styles that affect the mold surface. According to one style the mold surface has vacuum holes or a porous surface so that the vacuum may be pulled directly through the mold surface. Another style with a non-porous mold surface may be configured such that the mold is incorporated into a vacuum box or, alternatively, a master unit die (MUD), where the vacuum box or the MUD provides the vacuum to the mold surface. Other suitable styles of vacuum molds known by those skilled in the art may also be employed for thermoforming.

The forming process of a thermoplastic sheet may be accomplished by heating the sheet using heaters to soften the sheet for formability. Next, the sheet may be forced into contact with the mold by a vacuum, which draws the sheet to the mold surface. Finally, the sheet may be cooled below its softening point by either free or forced convection and/or thermal conduction by an actively or inactively cooled vacuum mold.

More recently, new material developments have resulted in plastic sheet constructions that include a decorative layer. One such plastic sheet construction is shown in a sectional view in FIG. 1, where the plastic sheet 10 includes a thermoplastic layer 12 and an opposite paint film layer 14. In this embodiment, the paint film layer 14 includes a paint layer 14a and a clear coating layer 14b. The paint layer 14a is bonded to the thermoplastic layer 12 by a tie or bond layer 16. This bond layer 16, however, may be optional depending on the specific material used in each of the adjoining layers. Other decorative constructions are also known, such as, but not limited to, a polymer color layer corresponding to the paint film layer 14, which is bonded or laminated to the thermoplastic layer 12.

The thermoplastic layer 12 may be made of a variety or combination of thermoplastic materials, such as but not limited to TPO, TPE, PP, PE, ABS, PC, ionomer, PET, or PBT. Depending on the choice of which thermoplastic material is used in the thermoplastic layer 12, different decorative paints, pigmented polymers and/or ionomers, or dry paint formulations may be used for the paint film layer 14. Other suitable formulations or constructions may also be used that are known by those skilled in the art.

However, there are inherent issues with this decorative plastic technology when conventional thermoforming techniques are used. Specifically, the paint film layer 14 may shift or vary in gloss if the paint film layer 14 exceeds a critical temperature specific to the plastic sheet 10 construction used during the thermoforming process. More specifically, hazing of the paint film layer 14 may be one of many possible results which may cause reflected light to diffuse and thus, producing a gloss shift or variation. This issue may be further compounded by the often higher temperatures required for thermoforming the thermoplastic layer 12.

One way around this issue is by heating the thermoplastic layer 12 side to a higher temperature than the paint film layer 14 side. However, thermal conduction through the plastic sheet 10 may occur, increasing the paint film layer 14 above its critical temperature. To prevent this, an active cooling technique directed at the paint film layer 14 side is needed. One approach may be by utilizing a chilled air pressure box interfaced with both a compressed air source and a chilled air source. The chilled air pressure box may also be contiguous the paint film layer 14 side of the plastic sheet 10, inboard of the clamp frame, during the forming and cooling stages. The compressed air source rapidly forces the plastic sheet 10 into contact with the vacuum mold during the forming stage. The chilled air source helps to cool the paint film layer 14 side, preventing excessive temperatures and thus, preserving the gloss to an acceptable level.

However, the applicants have discovered that butterfly and/or gate valve configurations which are external to the chilled air pressure box have produced less than desirable results for effectively controlling the flow of chilled and exhausting air. Because the external space outside the box is limited due to the clamping frame, heater access within the press configuration and further, because these valves are designed typically with large, heavy cast metal housings and robust actuators for sealing at high pressures, the size of these valves may be restricted. This limited valve size may result in less than desirable valve orifice sizes or flow areas and thus, the resulting flow rates of chilled air from the chilled air source may be insufficient for high volume production for effectively cooling the paint film layer 14 and preserving its gloss level during thermoforming.

The present invention provides a valve system arrangement internal to the chilled air pressure box which may in at least one embodiment provide a high volume production system with sufficient cooling of the paint film layer 14 in order to effectively preserve its gloss. Specifically, one embodiment of the present invention includes a chilled air pressure box having an inlet door valve and an exhaust door valve with a large orifice or flow area, which may preferably take advantage of the high pressure internal to the box during the forming stage to act on respective internal seals for sealing. These valves require no housing as they are internal to the box and because these valves may rely in part on the internal pressure from compressed air for sealing, the actuators for the valves may be less substantial, resulting in less weight and package space per valve so that the respective flow area may be preferably enhanced.

Specifically, one example the applicants discovered was that the maximum flow area size butterfly and/or gate valve that could be externally packaged for a chilled air box having a volume of 7,140 in$^3$ was a valve having a flow area of 12.56 in$^2$. Moreover, the respective weight and package space of the external valve was at least 50 lbs and 650 in$^3$. Thus, the respective ratio of weight to flow area and package space to flow area for the external valve was at least 4:1 lbs/in$^2$ and 50:1 in.

However, the applicants found that by placing the valve internally within the box, the valve housing was no longer necessary because there was no exiting flow conduit or coupling for the valve to interface with as was the case with the external valve. Additionally, the high internal pressure within the box during the forming stage of the plastic sheet could preferably be used to provide a sealing force for the valve, so that the valve weight, package space and flow area could be improved. Specifically, the applicants found that for the same 7,140 in$^3$ chilled air pressure box, a 27 in$^2$ flow area per valve was realizable. This valve may be made of any suitable material, however here, the applicants used a $\frac{3}{8}^{th}$ inch thick aluminum rectangular plate having a weight of 1 pound and a package space, including opening and closing of the valve, of 162 in$^3$. Thus the respective ratio of weight to flow area and of package space to flow area for the internal valve was 4:100 lbs/in$^2$ and 6:1 in. Consequently, the valve flow area according to the invention preferably may be at least, with increasing preference in the order given, 15, 20, 25 or 27 in$^2$. The valve weight to flow area ratio according to the invention preferably may be at least, with increasing preference in the order given, 1:1, 75:100, 50:100, 25:100, 15:100, 10:100 or 5:100 lbs/in$^2$. The valve package space to flow area ratio, which includes space for the valve to open and close, may be at least, with increasing preference in the order given, 20:1, 15:1, 10:1 or 7:1 in.

The applicants also discovered that by internalizing the inlet and the exhaust valve within the chilled air pressure box and enhancing their respective flow areas, the removal of heat from the plastic sheet was improved. Illustrative of this improved heat removal was the difference in air temperature proximate the inlet valve and the exhaust valve as taken more notably at the start of the cooling stage than at the end of the cooling stage. The difference in inlet and exhaust air for the external valves at the start of the cooling stage was 2° F. and at the end of the cooling stage it was 20° F. However, for the internal valves, the difference in inlet and exhaust air at the start of the cooling stage was 23° F. and at the end of the cooling stage it was 15° F. Thus, the difference for the internal valves was significantly higher from the start of the cooling stage, indicating a larger and more rapid removal of heat. Consequently, the substantially initial cooling stage difference in air temperature proximate the inlet and the exhaust valve may be at least, with increasing preference in the order given 10, 15, or 20° F.

Figure 2:
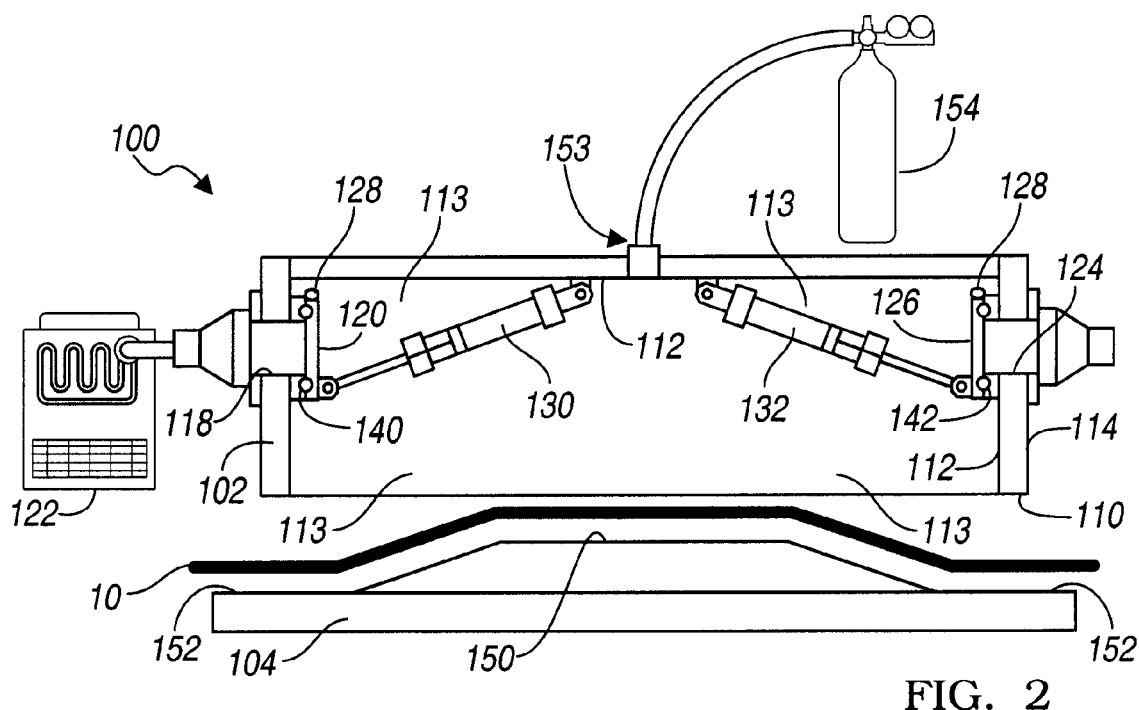
FIG. 2 is a sectional view of one embodiment of the present invention showing the chilled air pressure box, a plastic sheet and the vacuum mold.

Referring now to the drawings, FIG. 2 illustrates at least one embodiment of the present invention for a thermoforming arrangement 100. The thermoforming arrangement 100 includes a chilled air pressure box 102 and a vacuum mold 104 for thermoforming a plastic sheet 10.

The chilled air pressure box 102 and the vacuum mold 104 may be made of any suitable material known by those skilled in the art.

The chilled air pressure box 102 has a box perimeter 110 that interfaces with the vacuum mold 104 either directly or indirectly. For example, the box perimeter may directly contact the plastic sheet 10, which contacts the vacuum mold 104 to create a sealable interface. Alternatively, the box perimeter 110 may interface directly with the vacuum mold 104 or in any other suitable manner.

The chilled air pressure box 102 has an interior surface 112 that defines an interior space 113 within the chilled air pressure box 102. The chilled air pressure box 102 also has an opposite exterior surface 114.

The chilled air pressure box 102 further includes an inlet opening 118 that extends through the interior surface 112 and the exterior surface 114. The inlet opening 118 may be any suitable shape of opening. In this embodiment, it is a substantially rectangular shaped opening.

An inlet valve 120 is substantially disposed within the interior space 113, adjacent and aligned with the inlet opening 118 such that when the inlet valve 120 is closed, the inlet opening 118 is substantially sealed and when the inlet valve 120 is opened, the inlet opening 118 is not sealed. In this embodiment, the inlet valve 120 is a substantially rectangular planar door valve. However, other suitable shapes and types of valves known by those skilled in the art may also be used.

The inlet opening 118 also communicates with a chilled air source 122. The chilled air source 122 may be an air conditioning type unit or chiller or any other suitable unit or means of providing a source of chilled air known by those skilled in the art. A temperature of the chilled air at the chilled air source is substantially between 32° F. to 65° F.

The inlet valve 120 may also be pivotally attached 128 to the interior surface 112 as shown in this embodiment, or attached in another suitable manner or even not attached to the interior surface 112. One example of this latter configuration is shown later in FIGS. 3a-3e.

The chilled air pressure box 102 further includes an exhaust opening 124 which extends through the interior surface 112 and through the exterior surface 114. The exhaust opening 124 may be any suitable shape of opening. In this embodiment, it is a substantially rectangular shaped opening.

An exhaust valve 126 is substantially disposed within the interior space 113, adjacent and aligned with the exhaust opening 124 such that when the exhaust valve 126 is closed, the exhaust opening 124 is substantially sealed and when the exhaust valve 126 is opened, the exhaust opening 124 is not sealed. In this embodiment, the exhaust valve 126 is a substantially rectangular planar door valve. However, other suitable shapes and types of valves known by those skilled in the art may also be used.

The exhaust valve 126 may also be pivotally attached 128 to the interior surface 112 as shown in this embodiment, or attached in another suitable manner or even not attached to the interior surface 112. One example of this latter configuration is shown later in FIGS. 3a-3e.

The chilled air pressure box 102 further includes a first mechanical device 130. The first mechanical device 130 may include a pneumatic cylinder as shown in this embodiment or it may be any other suitable actuating device known by those skilled in the art. The first mechanical device 130 may also interface with a controller which may be a computer or other logical device which executes application programs and/or which performs other logical exercises. The first mechanical device 130 in this embodiment is shown as mounted to the interior surface 112 and attached to the inlet door valve 120.

The chilled air pressure box 102 further includes a second mechanical device 132. The second mechanical device 132 may include a pneumatic cylinder as shown here or may be any other suitable actuating device known by those skilled in the art. The second mechanical device may also interface with a controller. The second mechanical device 132 in this embodiment is shown as being mounted to the interior surface 112 and attached to the exhaust valve 126. Both the first mechanical device 130 and the second mechanical device 132 are substantially disposed within the interior space 113 and respectively perform opening and closing of the inlet and the exhaust valves 120 and 126 by actuation.

The chilled air pressure box 102 further includes an inlet seal 140 and an exhaust seal 142. The inlet and exhaust seals 140 and 142 may be made from plastic, rubber, foam, elastomer, or any suitable material for sealing known by those skilled in the art. The inlet seal 140 is disposed between the inlet valve 120 and the interior surface 112. The exhaust seal 142 is disposed between the exhaust valve 126 and the interior surface 112. In this embodiment, the inlet and the exhaust seal 140 and 142 are respectively disposed adjacent the perimeter of the inlet and the exhaust openings 118 and 124. However, other suitable sealing configuration may be used.

The chilled air pressure box 102 may include a compressed air valve 153 or other configuration for interfacing with a compressed air source 154. The compressed air source 154 may provide compressed air by a pump, in-house compressed air system, compressed air tanks, compressed air accumulator or any other suitable means. The compressed air may be an oxygen and/or a nitrogen composition or another suitable inert gas. The compressed air valve 153 controls the flow of compressed air into the interior space 113. The compressed air source 154 is capable of pressurizing the interior space 113 of the chilled air pressure box 102 with compressed air.

When the interior space 113 is pressurized, the inlet valve 120 is in a closed position and acts on the inlet seal 140 by pressure from compressed air. Also, when the interior space is pressurized, the exhaust valve 126 is closed and acts on the exhaust seal 142 by pressure from compressed air.

Figure 3A:
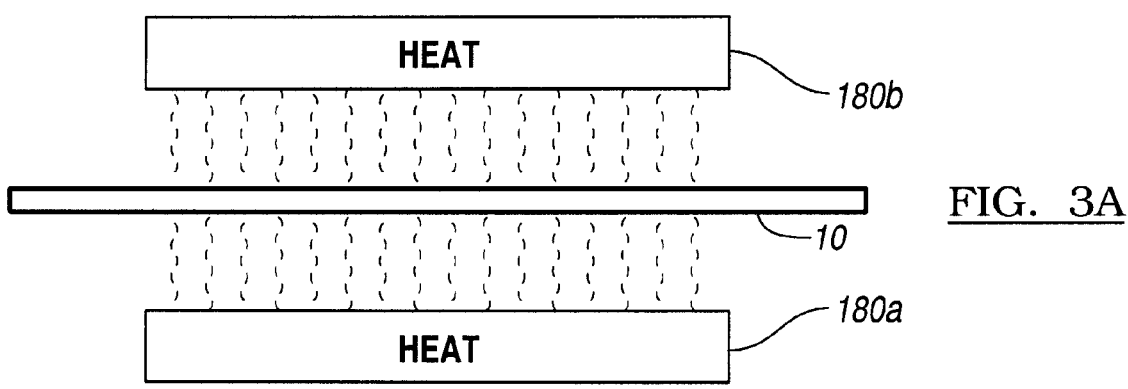
FIGS. 3a-3e are sectional views depicting a method of thermoforming the plastic sheet with a chilled air pressure box in accordance with one embodiment of the present invention.

Referring now to FIGS. 3a-3e, at least one embodiment of the present invention is illustrated in these sectional views. In FIG. 3a, the plastic sheet 10 is heated by a heater arrangement 180a and 180b which may be included as part of a thermoforming press. Heaters 180a and 180b may be set to predetermined temperatures which may or may not be the same, thus allowing for preferential heating of the plastic sheet 10. Heating arrangements and types of heaters are well known in the art and any suitable arrangement and type may be used for heating the plastic sheet 10.

Figure 3B:
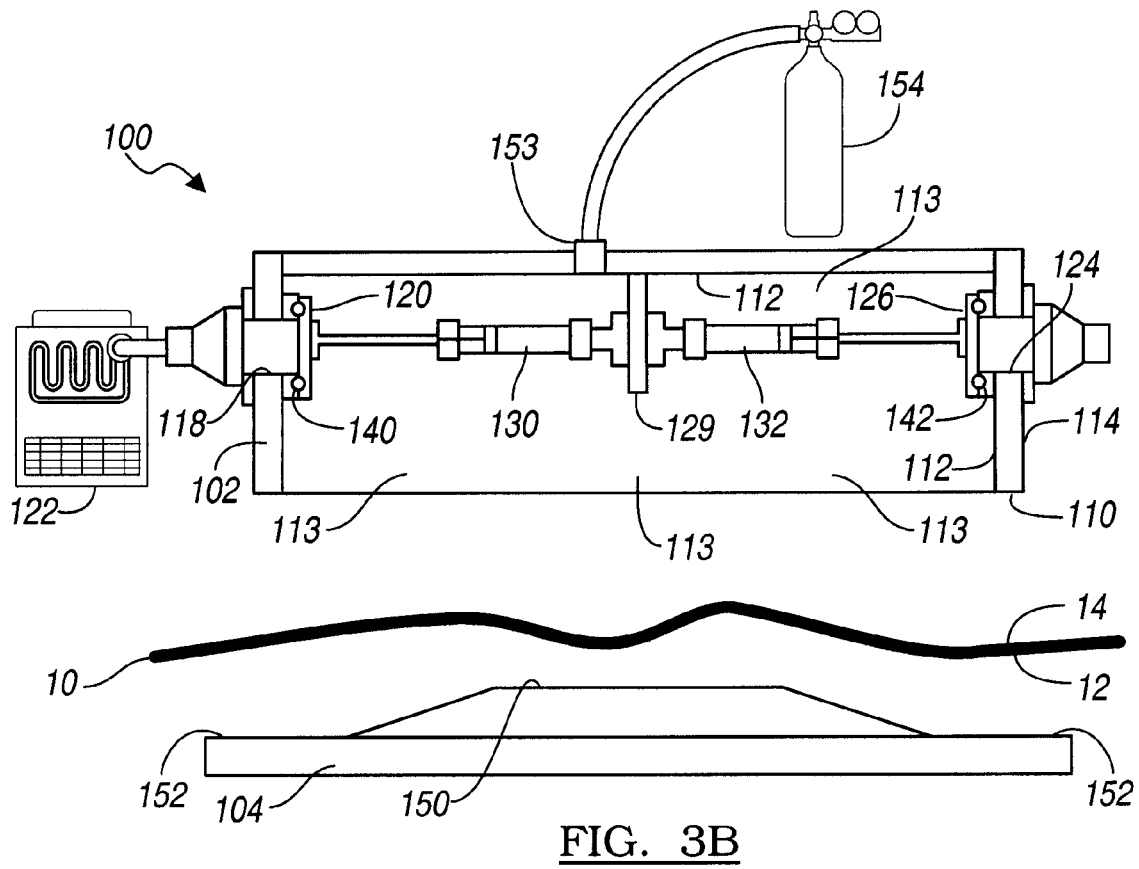

In FIG. 3b, the heated plastic sheet 10 is introduced to a vacuum mold 104 and a chilled air pressure box 102. The introduction of the heated plastic sheet 10 to the vacuum mold 104 and the chilled air pressure box 102 may be substantially simultaneous or not, and may occur in alternative orders. The plastic sheet 10 has a first side comprising a thermoplastic layer 12 and an opposite second side comprising a paint film layer 14 having an initial gloss. In at least one embodiment, the first side 12 has been heated to a higher temperature than the second side 14. For instance, a plastic sheet with a TPO thermoplastic layer 12 may be heated to a temperature of 385 F, while the paint film layer 14 may not exceed 325 F. However, another plastic sheet construction with, for instance, a different molecular weight TPO or a different thermoplastic, ABS for example, may have a different heating profile for processing.

The vacuum mold 104 has a mold surface 150 and may also have a mold shut-off surface 152 depending on the vacuum mold 104 configuration. The mold surface 150 may be porous or non-porous and constructed of epoxy, REN wood, aluminum, kirksite, nickel, metal or any other suitable material known by those skilled in the art. The thermoplastic layer 12 faces toward the mold surface 150. The paint film layer 14 faces toward the interior space 113 of a chilled air pressure box 102. Notably, in this embodiment, the inlet valve 120 and the exhaust valve 126 are not pivotally attached to the interior surface 112. Additionally, in this embodiment, an alternative arrangement of the first mechanical device 130 and the second mechanical device 132 are shown as being attached to a plate 129 disposed within the interior space 113.

Figure 3C:
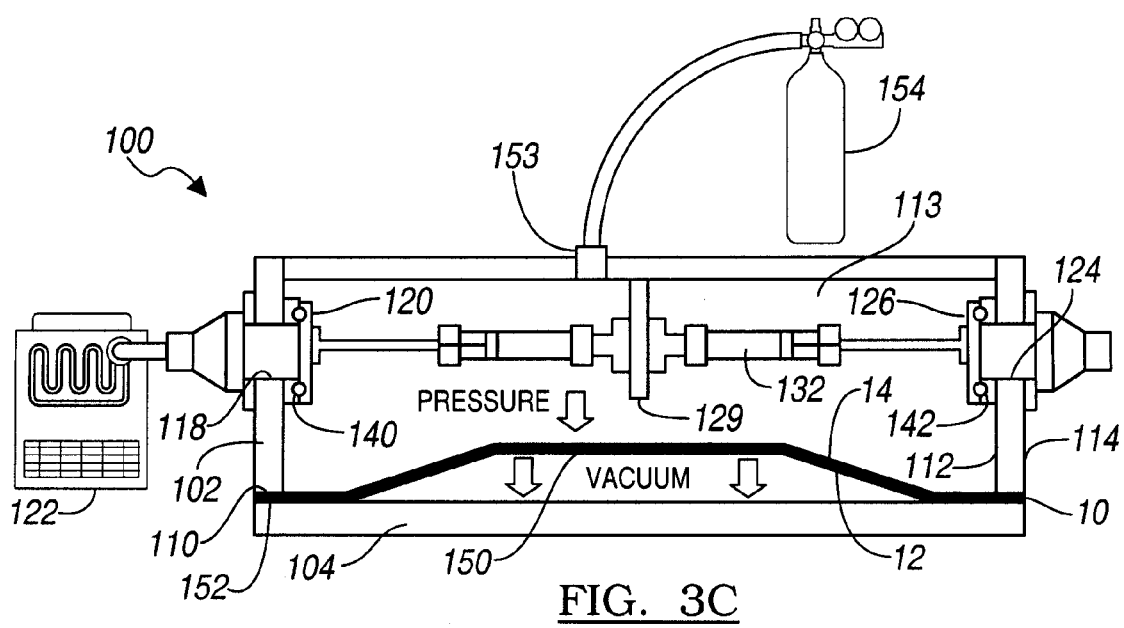

In FIG. 3c, the plastic sheet 10 is forced to conform to the shape of the mold surface 150 by applying a vacuum to the mold surface 150, which is interfaced with a vacuum source, substantially simultaneously with pressurizing the interior space 113 by the compressed air source 154. However, the vacuum may also be applied prior to the pressurizing of the interior space. The vacuum draws the first side 12 to the mold surface 150 and the pressure pushes the second side 14 towards the mold surface 150. Typically, the vacuum source may provide a vacuum substantially between 5 and 25 inches of mercury and the vacuum may be applied typically for more than 5 seconds. Additionally, both the inlet valve 120 and the exhaust valve 126 are in a closed position and act on the respective inlet seal 140 and exhaust seal 142 by pressure from the compressed air. Moreover, the chilled air pressure box 102 interfaces with the vacuum mold 104 by the box perimeter 110.

Figure 3D:
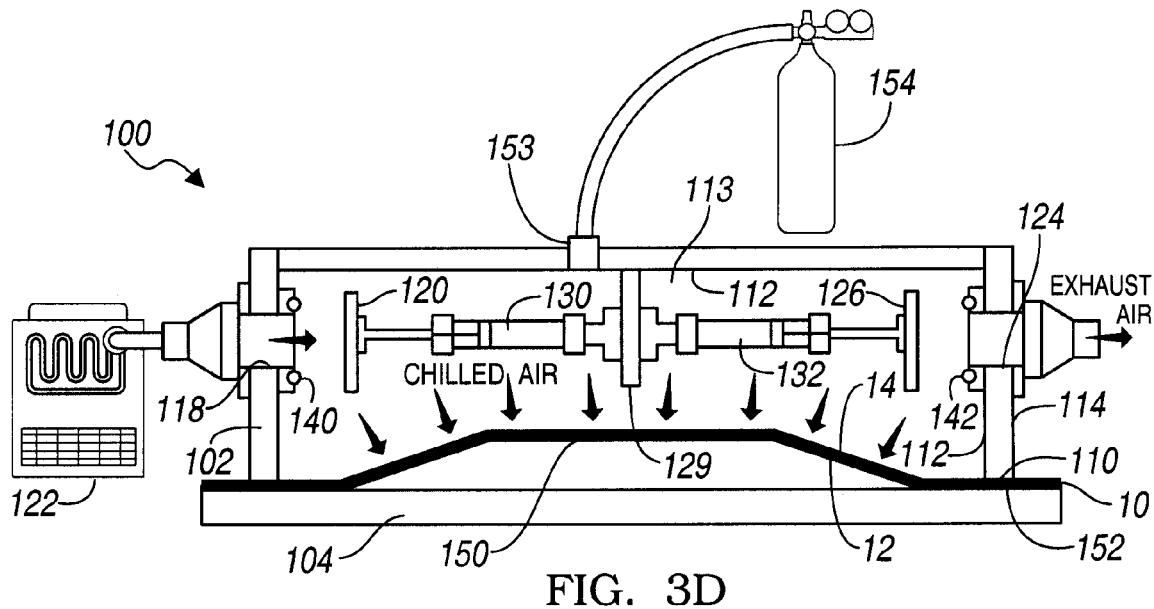

In FIG. 3*d*, the compressed air source 154 may be deactivated and this may be accomplished by either closing the compressed air valve 153 or by another suitable manner.

The plastic sheet 10 is cooled by opening the inlet door valve 120 whereby chilled air enters the interior space 113 and contacts the second side 14, wherein the second side 14 is cooled at a rate that substantially preserves the initial gloss. The exhaust valve 126 may also be substantially simultaneously opened whereby the interior space 113 may exhaust both pressurized air and warmed air which originated from the chilled air source and interfaced with and became heated by the second side 14 of the plastic sheet.

The opening of the inlet valve 120 and the exhaust valve 126 may be respectively performed by actuation of the first and the second mechanical devices 130 and 132. As shown here, the inlet seal 140 and exhaust seal 142 are not attached to the inlet door valve 120 and exhaust door valve 126. However, in other embodiments the seals 140 and 142 may be attached to the inlet and the exhaust valve 120 and 126.

Figure 3E:
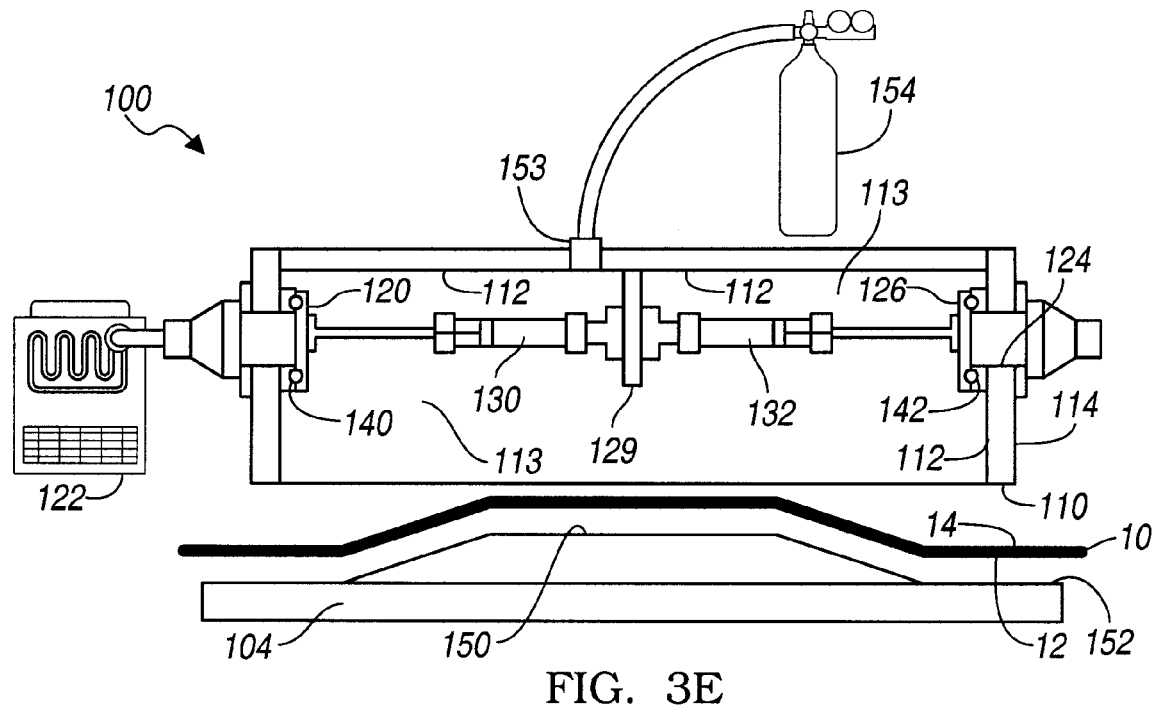

In FIG. 3*e*, the plastic sheet 10 has been formed and cooled to the shape of the mold surface 150. The plastic sheet 10 is now ready to be removed from the vacuum mold 104 and may be trimmed or otherwise prepared to be a finished trim component or otherwise decorative finished part.

While the best mode for carrying out the invention has been described in detail, those familiar with the art to which this invention relates will recognize various alternative designs and embodiments for practicing the invention as defined by the following claims.

What is claimed:

1. A chilled air pressure box for thermoforming a plastic sheet, the chilled air pressure box comprising: a wall defining a box having an interior surface and an opposite exterior surface, the interior surface defining an interior space within the box, the box defining an inlet opening extending through the interior surface and the exterior surface; the wall further defining a box perimeter for interfacing with a vacuum mold; an inlet valve that is a door valve disposed within the interior space, adjacent and aligned with the inlet opening such that when the inlet valve is closed the inlet opening is substantially sealed, and when the inlet valve is opened the inlet opening is not sealed; a compressed air source, capable of pressurizing the interior space with compressed air, interfaced with the box; a chilled air source communicating with the inlet opening; and an inlet seal disposed between the inlet valve and the interior surface, wherein when the interior space is pressurized, pressure from compressed air forces the door valve against the inlet seal.

2. The chilled air pressure box of claim 1 further comprising a first mechanical device substantially disposed within the interior space and attached to the inlet valve, whereby the closing or opening of the inlet valve is performed by actuation of the first mechanical device.

3. The chilled air pressure box of claim 2 wherein the first mechanical device includes a pneumatic cylinder.

4. The chilled air pressure box of claim 1 further comprising: an exhaust opening defined by the box and extending through the interior surface and the exterior surface; and an exhaust valve substantially disposed within the interior space, adjacent and aligned with the exhaust opening such that when the exhaust valve is closed the exhaust opening is substantially sealed, and when the exhaust valve is opened the exhaust opening is not sealed.

5. The chilled air pressure box of claim 4 further comprising a second mechanical device substantially disposed within the interior space and attached to the exhaust valve, whereby the closing or opening of the exhaust valve is performed by actuation of the second mechanical device.

6. The chilled air pressure box of claim 4 wherein the exhaust valve is a door valve and the chilled air pressure box further comprising an exhaust seal disposed between the exhaust valve and the interior surface, whereby when the interior space is pressurized, the exhaust valve is closed and acts on the exhaust seal by the compressed air.

7. The chilled air pressure box of claim 6 wherein the inlet valve and the exhaust valve have respective flow areas greater than or equal to 15 in$^2$, a valve weight to flow area ratio less than or equal to 1:1 lb/in$^2$ and a valve package space to flow area ratio less than or equal to 20:1 in.

8. The chilled air pressure box of claim 7 wherein the inlet valve and the exhaust valve are substantially rectangular and planar.

9. A chilled air pressure box for thermoforming a plastic sheet, the chilled air pressure box comprising:

a wall defining a box having an interior surface and an opposite exterior surface, the interior surface defining an interior space within the box, the box defining an inlet opening extending through the interior surface and the exterior surface;

the wall further defining a box perimeter for interfacing with a vacuum mold;

an inlet valve disposed within the interior space and interfaced with the inlet opening such that when the inlet valve is closed the inlet opening is substantially sealed, and when the inlet valve is opened the inlet opening is not sealed;

a compressed air source, capable of pressurizing the interior space with compressed air, interfaced with the box;

a chilled air source communicating with the inlet opening; and an inlet seal disposed between the inlet valve and the interior surface, whereby when the interior space is pressurized, the inlet valve is closed and acts on the inlet seal by pressure from compressed air.

10. The chilled air pressure box of claim 9 further comprising:

an exhaust opening defined by the box and extending through the interior surface and the exterior surface;

an exhaust valve substantially disposed within the interior space and interfaced with the exhaust opening such that when the exhaust valve is closed the exhaust opening is substantially sealed, and when the exhaust valve is opened the exhaust opening is not sealed; and an exhaust seal disposed between the exhaust valve and the interior surface, whereby when the interior space is pressurized, the exhaust valve is closed and acts on the exhaust seal by pressure from compressed air.

11. The chilled air pressure box of claim 10 further comprising a first and a second mechanical device substantially disposed within the interior space and attached respectively to the inlet and the exhaust valve, wherein the closing or opening of the inlet and the exhaust valve is performed respectively by actuation of the first and the second mechanical device.

12. The chilled air pressure box of claim 10 wherein the inlet valve and the exhaust valve have respective flow areas greater than or equal to 15 in$^2$, a valve weight to flow area ratio less than or equal to 1:1 lb/in² and a valve package space to flow area ratio less than or equal to 20:1 in.

13. A method of thermoforming a plastic sheet, wherein the plastic sheet has a first side comprising a thermoplastic layer and an opposite second side comprising a paint film layer having an initial gloss, the method comprising:
heating the plastic sheet;
introducing the plastic sheet to a vacuum mold comprising a mold surface, wherein the first side faces toward the mold surface;
introducing the plastic sheet to a chilled air pressure box comprising:
a box having an interior space within the box and interfaced with a compressed air source, capable of pressurizing the box with compressed air;
an inlet seal substantially disposed within the interior space; and
an inlet door valve substantially disposed within the interior space and communicating with a chilled air source, capable of cooling the interior space with chilled air, whereby the inlet door valve is in a closed position when the interior space is pressurized, and seals the interior space from chilled air by acting on the inlet seal by pressure from compressed air, and when the inlet door valve is in an open position the interior space is not sealed;
wherein the second side faces toward the interior space;
forcing the plastic sheet to conform to the shape of the mold surface by applying a vacuum to the mold surface by a vacuum source substantially simultaneously with pressurizing the interior space, wherein the vacuum draws the first side to the mold surface and compressed air pushes the second side toward the mold surface; and
cooling the plastic sheet by opening the inlet door valve whereby chilled air enters the interior space and contacts the second side, wherein the second side is cooled at a rate that substantially preserves the initial gloss.

14. The method of claim 13 wherein the step of heating the plastic sheet provides the first side with a higher temperature than the second side.

15. The method of claim 13 wherein the step of forcing the plastic sheet to conform to the shape of the mold surface applies the vacuum to the mold surface prior to pressurizing the interior space.

16. The method of claim 13 wherein the chilled air pressure box further comprises:
an exhaust seal substantially disposed within the interior space; and
an exhaust door valve substantially disposed within the interior space, whereby the exhaust door valve is in a closed position when the interior space is pressurized, and seals the interior space from exhausting compressed air by acting on the exhaust seal by pressure from compressed air, and when the exhaust door valve is in an open position the interior space is not sealed;
wherein the step of cooling the plastic sheet further includes opening of the exhaust door valve substantially simultaneously with the opening of the inlet door valve.

17. The method of claim 16 wherein the chilled air pressure box further comprises a first and a second mechanical device substantially disposed within the interior space and respectively attached to the inlet and the exhaust door valve, wherein the step of cooling the plastic sheet further includes opening of the inlet door valve and the exhaust valve respectively by actuating the first and the second mechanical device.

18. The method of claim 16 wherein the inlet and the exhaust valve have respective flow areas greater than or equal to 15 in² and a temperature of the chilled air at the chilled air source is substantially between 32° F. to 65° F., wherein the step of cooling the plastic sheet provides a substantially initial difference in air temperature proximate to the inlet and the exhaust valve having a temperature greater than or equal to 10° F.

* * * * *